(12) United States Patent
Lyberis

(10) Patent No.: US 10,936,474 B2
(45) Date of Patent: Mar. 2, 2021

(54) SOFTWARE TEST PROGRAM GENERATION

(71) Applicant: Arm Limited, Cambridge (GB)

(72) Inventor: Spyros Lyberis, Cambridge (GB)

(73) Assignee: Arm Limited, Cambridge (GB)

(*) Notice: Subject to any disclaimer, the term of this patent is extended or adjusted under 35 U.S.C. 154(b) by 177 days.

(21) Appl. No.: 15/906,094

(22) Filed: Feb. 27, 2018

(65) Prior Publication Data
US 2019/0179733 A1  Jun. 13, 2019

(30) Foreign Application Priority Data
Dec. 13, 2017  (GR) .............................. 20170100567

(51) Int. Cl.
*G06F 11/36* (2006.01)
*G06F 8/65* (2018.01)

(52) U.S. Cl.
CPC ........ *G06F 11/3684* (2013.01); *G06F 11/368* (2013.01); *G06F 11/3608* (2013.01); *G06F 8/65* (2013.01)

(58) Field of Classification Search
CPC combination set(s) only.
See application file for complete search history.

(56) References Cited

U.S. PATENT DOCUMENTS

| | | | | | |
|---|---|---|---|---|---|
| 4,228,537 | A | * | 10/1980 | Henckels | G06F 11/261 714/33 |
| 4,852,093 | A | * | 7/1989 | Koeppe | G06F 11/261 714/33 |
| 5,001,714 | A | * | 3/1991 | Stark | G01R 31/2846 702/117 |
| 7,373,550 | B2 | * | 5/2008 | Brawn | G06F 11/3688 703/22 |
| 8,615,695 | B2 | * | 12/2013 | Guo | G01R 31/318525 714/726 |
| 8,813,039 | B2 | * | 8/2014 | Maczuba | G06F 11/0778 714/25 |
| 9,465,725 | B2 | * | 10/2016 | Maczuba | G06F 11/0778 |
| 9,630,719 | B2 | * | 4/2017 | Hawkins | B64D 11/02 |
| 2008/0276206 | A1 | * | 11/2008 | Mariani | G06F 11/2252 716/136 |
| 2015/0254383 | A1 | * | 9/2015 | Tso-Sheng | G06F 17/5022 716/107 |
| 2015/0309920 | A1 | * | 10/2015 | Ishigooka | G06F 11/3688 717/126 |

* cited by examiner

*Primary Examiner* — Amine Riad
(74) *Attorney, Agent, or Firm* — Nixon & Vanderhye P.C.

(57) ABSTRACT

A simulation of software test program executing upon a primary model of a portion of a data processing apparatus is performed to identify uncovered (undetected) failures. A formal method analysis is then performed upon a combination of the primary model and a fault-simulating model simulating the uncovered failures in order to identify software stimuli that can render the uncovered failures detectable. The identified software stimuli are then added to the software test program to increase the failure coverage. The process is performed iteratively until a desired level of failure coverage is achieved.

17 Claims, 6 Drawing Sheets

SOFTWARE TEST PROGRAM GENERATION

This application claims priority to GR Patent Application No. 20170100567 filed Dec. 13, 2017, the entire contents of which are hereby incorporated by reference.

BACKGROUND

Technical Field

This disclosure relates to the field of data processing systems. More particularly, this disclosure relates to the generation of software test programs for detecting failures arising within data processing systems.

Technical Background

It is known that failures can arise during the life of data processing systems due to factors such as circuit ageing and particle strikes. In some circumstances the data processing systems concerned may be controlling safety critical operations and it is important that such failures are reliably detected. In order to assist in such detection, it is known to use software test programs which are regularly run by a target data processing system when in use. If the target data processing system is free from errors, then the result of running such a software test program will match the expected result. However, if there are failures within the target data processing system that change its response to executing program instructions, then these failure will be detected as the result of running the software test program will not match the expected result as determined by the software test program.

As the complexity of data processing systems increases, there is an increase in the number of potential points of failure within those data processing systems, such as stuck-at errors within integrated circuits. Software test programs are typically handwritten by engineers with a detailed knowledge of the design of the data processing system with a view to exposing failures should they arise. However, this process is time consuming and highly skilled. Another issue is that with an increased use of synthesis tools in producing final circuit layouts, it can be difficult for even a skilled engineer familiar with the design to write a software test program which will render discoverable a failure within a portion of a circuit which has been generated by the synthesis tools as the particular function of an individual gate or standard cell within such a synthesised portion of the design may not yet be readily determined.

SUMMARY

Viewed from one aspect, the present disclosure provides a computer implemented method of generating a software test program for execution by target data processing apparatus to test for failure of said target data processing apparatus, said method comprising:
  identifying using a primary model of at least a portion of said target data processing apparatus an uncovered failure within said target data processing apparatus that is undetected by execution of a current version of said software test program by said target data processing apparatus;
  generating a failure-simulating model of said at least a portion of said target data processing apparatus providing an ability to simulate said uncovered failure;
  analyzing a combination of said primary model and said failure-simulating model to identify a software stimulus corresponding to execution of a stimulus program instruction that result in a detectable difference in response between said primary model and said failure-simulating model when simulating said uncovered failure; and
  adding said stimulus program instruction to said current version of software test program to form an updated version of said software test program.

Other aspects of the present disclosure include a non-transitory computer readable medium storing a computer program to control a computer to perform a method as set out above, a software test program generated using a computer implemented method as set out above, and typically containing a portion of handwritten code followed by one or more portions of automatically generated code containing many literals and otherwise unrelated program instructions. A further aspect of the present disclosure comprises an apparatus for generating a software test program comprising a data processing apparatus programmed to perform a computer implemented method as set out above.

Further aspects, features and advantages of the present technique will be apparent from the following description of examples, which is to be read in conjunction with the accompanying drawings.

DESCRIPTION OF EXAMPLES

Figure 1:
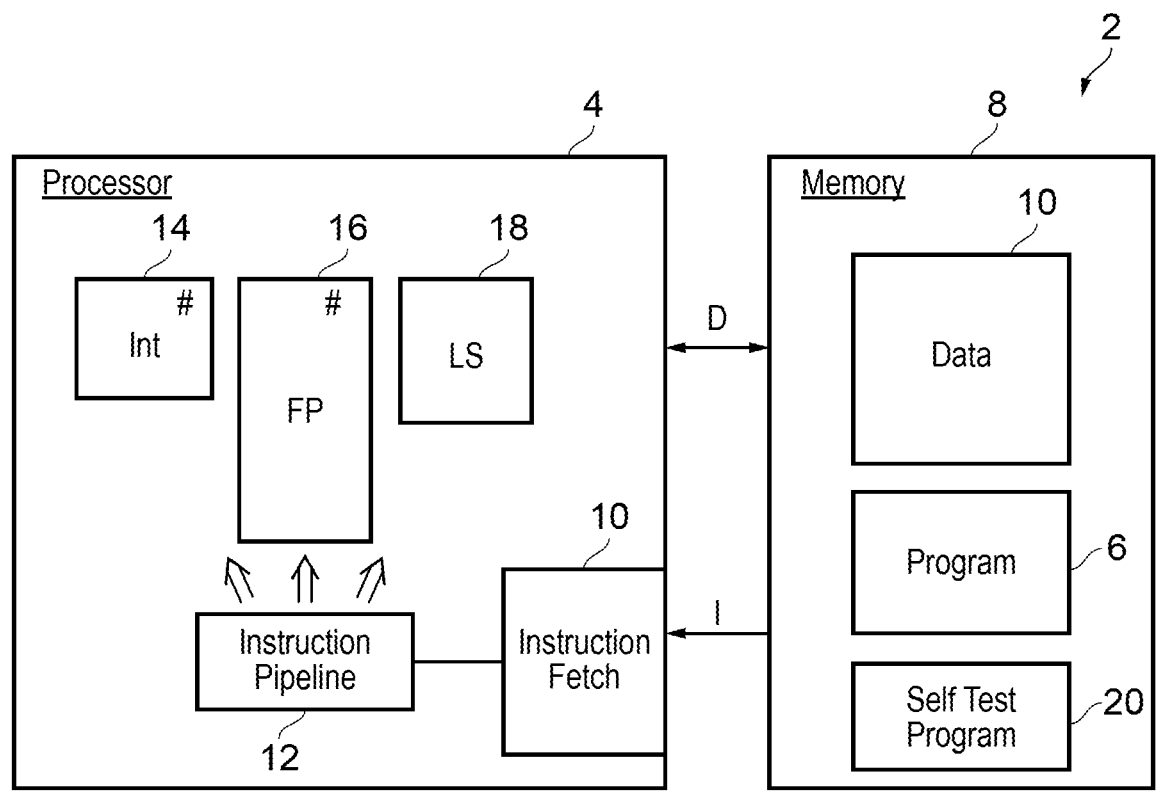
FIG. 1 schematically illustrates a target data processing apparatus which can be tested for hardware failures (such as due to circuit ageing and/or particle strikes) using periodically executed software test program instructions.

FIG. 1 schematically illustrates a data processing system 2 comprising an integrated circuit processor 4 for executing program instructions 6 stored within a memory 8 in order to manipulate data values 10 also stored within the memory 8. The processor 4 includes instruction fetch circuitry 10 for fetching instructions to be executed from the memory 8 and supplying these to an instruction pipeline 12 where they are decoded to generate control signals which control execution pipelines 14, 16, 18 within the processor 4 to perform processing operations as specified by those program instructions. Execution pipelines 14, 16, 18 include an integer arithmetic pipeline 14, a floating point arithmetic pipeline 16 and a load/store pipeline 18. The integer arithmetic pipeline 14 and the floating point pipeline 16 comprise data path circuit blocks within the processor 4 to execute data processing operations upon operand values corresponding to logical and/or arithmetic operations.

The processor 4 may be subject to failure of components during use, such as due to circuit ageing, particle strikes, or other reasons. In order to detect such failures the memory 6 stores a software test program 20 which is periodically executed by the processor 4. The software test program 20 compares expected results from its own execution with observed results from its own execution. If the expected results differ from the observed results, then this is indicative of a failure having occurred within the circuitry of the processor 4. When such a failure is detected, appropriate reporting and/or remedial actions may be taken.

It is desirable that the software test program 20 should be quick to execute and require relatively little storage within the memory 8. A conflicting requirement is that the software test program 20 should have a high probability of detecting failures wherever they occur within the circuitry of the processor 4. It is a difficult and skilled task to meet these requirements. Typically software test programs are hand-written by engineers familiar with the design of the processor 4 with a view to exercising (using) a high proportion of its circuit elements in a manner which will reveal if those circuit elements are subject to any failure. However, due to factors such as those previously mentioned, it is difficult to achieve a high degree of failure coverage. In order to assist in increasing the degree of failure coverage the present disclosure describes a computer implemented method of generating and/or adding to a software test program for execution by a target data processing apparatus to extend the test coverage for that target data processing apparatus.

Figure 2:
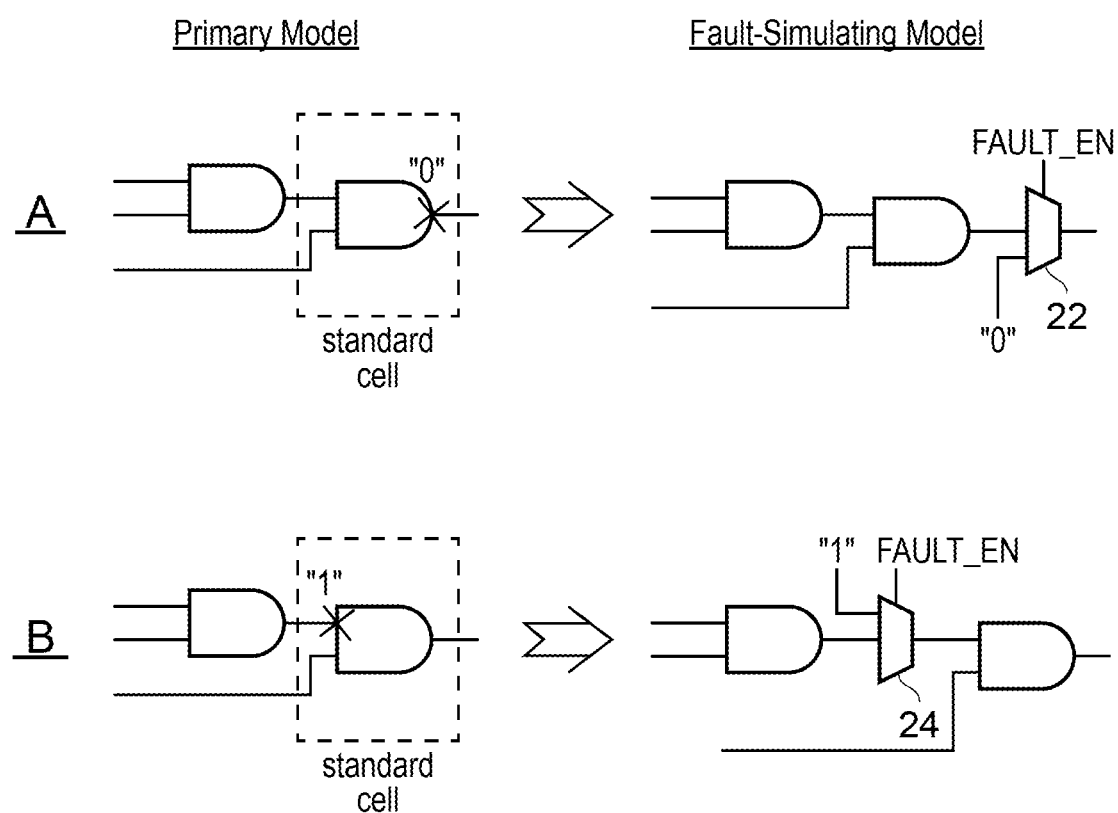
FIG. 2 schematically illustrates how a portion of a primary model of a target data processing apparatus may be modified to form a fault-simulating model of that portion.

FIG. 2 schematically illustrates a primary model of a portion of a target data processing apparatus and a corresponding fault-simulating model of that portion. The simplified representation in FIG. 2 indicates that the primary model comprises models of two connected AND gates. In example A, the final AND gate may subject to a stuck-at failure whereby the output from the standard cell comprising that final OUT gate is fixed at "0" irrespective of the value of the inputs to that AND gate. Such a failure may be simulated within a fault-simulating model by including within that model a multiplexer 22 which can selectively direct a fixed value of "0" to the output when selected by a fault enabling signal FAULT_EN. In this way, the fault-simulating model permits a failure corresponding to a stuck-at output of "0" to be simulated. This fault-simulating model in combination with the corresponding primary model may then be used as described further below as a way of identifying a suitable software stimulus which will allow such a failure to be detected if it should arise.

Example B in FIG. 2 illustrates a further potential failure within the combination of the two AND gates. In this case one of the inputs to the final AND gate is subject to a stuck-at error tying it to a value of "1". This failure can be simulated within the corresponding fault-simulating model by introducing a multiplexer 24 to selectively apply a fixed input value of "1" to the input of the final AND gate if this is selected by the FAULT_EN signal.

Figure 3:
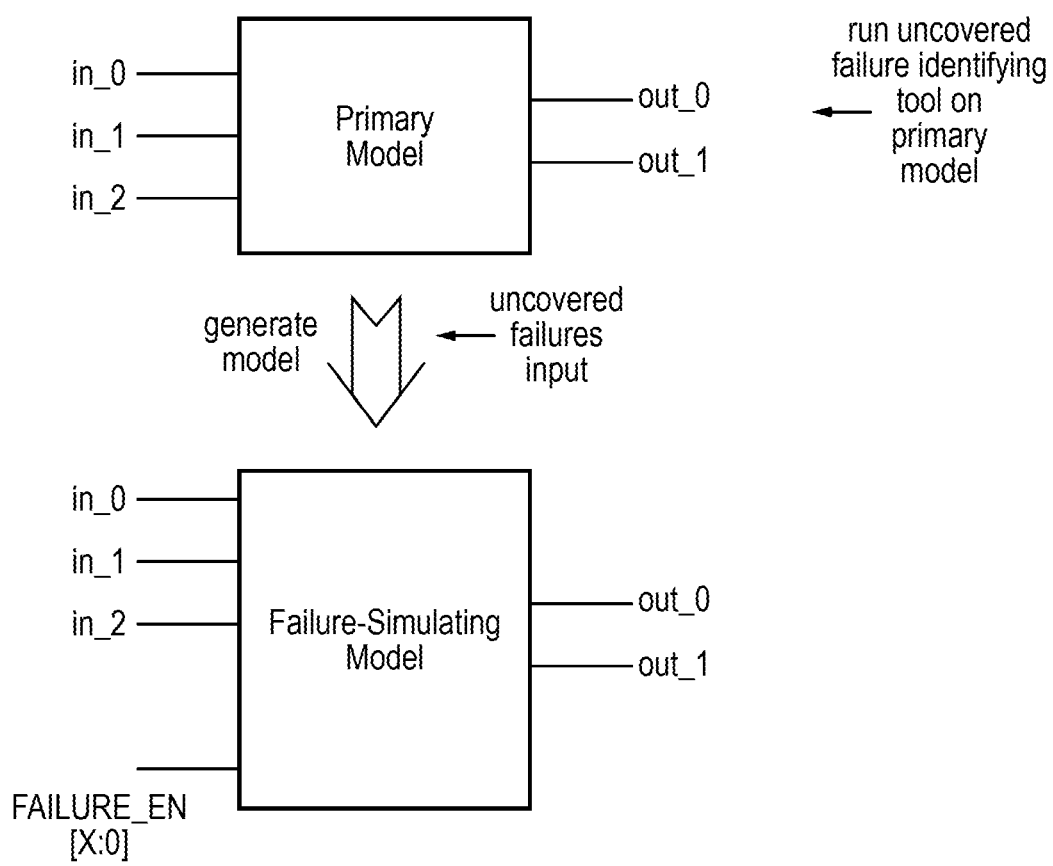
FIG. 3 schematically illustrates inputs and outputs associated with a primary model of a portion of a target data processing apparatus and an associated failure-simulating model of that portion of a target data processing apparatus.

FIG. 3 schematically illustrates more generally how a failure-simulating model is related to a corresponding primary model of a portion of a target data processing apparatus. In this abstraction, the portion of the target data processing apparatus within which coverage of uncovered failures is to be improved is represented by a circuit block having three input signals and two output signals. It will be appreciated that in practice, such a portion of a target processing apparatus to be modelled may have many more inputs and outputs.

The primary model is subject to an identification process by which currently uncovered (i.e. undetectable with the current version of the software test program) failures within portions of the circuitry represented by the primary model are detected. Such identification comprises the simulated execution of a current version of a software test program with the corresponding inputs being supplied to the primary model and a determination being made as to whether or not there is a detectable different in the corresponding outputs when failures are simulated at different points within the circuitry of the primary model. The result of execution of the uncovered failure identifying tool on the primary model comprise data identifying uncovered failures within that model for the current version of the software test program. This identification of uncovered failures may be used as one input to a process of generating a failure-simulating model corresponding to the primary model. The failure-simulating model uses the identification of the uncovered failure points to insert appropriate multiplexers 22, 24 or other circuitry within the layout of the primary model in order to enable failures at those points to be selectively simulated as controlled by failure control signals FAILURE_EN[x:0] supplied as an additional input to the failure-simulating model. The uncovered failure identifying tool is a software tool such as the Z01X fault simulation tool produces by Synopsys Inc. A computer executed script may then serve to parse the uncovered fault report from the Z01X tool and add a multiplexer, or other fault simulating circuitry, at each identified uncovered failure point. The resulting modified model comprises the failure-simulating model of the portion of the target data processing apparatus concerned.

Figure 4:
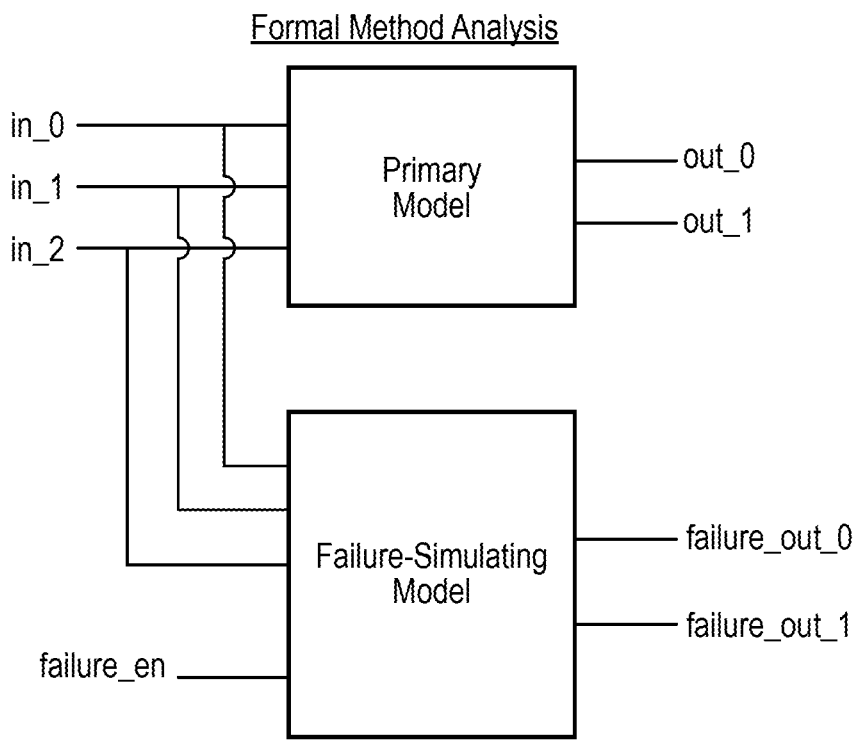
FIG. 4 schematically illustrates analysing a combination of the primary model and the failure-simulating model using a formal method in order to identify a software stimulus which will render detectable a previously uncovered failure.

FIG. 4 schematically illustrates how a combination of the primary model and the failure-simulating model may be analysed using formal method analysis to identify a predetermined (user set) number of software stimuli corresponding to execution of one or more stimulus program instructions by the target data processing apparatus that result in a detectable difference in response between the primary model and the failure-simulating model when the failure-simulating model is simulating a particular uncovered failure. More particularly, the inputs of the primary model are fed in parallel to the corresponding inputs of the failure-simulating model. The models are then subject to a combined analysis by a formal method tool such as Jasper (produced by Cadence Designs Systems Inc) to identify any difference in the respective output signals which arise when the failure-simulating model is simulating a particular uncovered failure. More particularly, as illustrated in FIG. 4, the stimulus discovery can be represented mathematically as the process of discovering a combination of input signals applied when the failure signal for the particular uncovered failure is enabled and either of the two output signals from the primary model do not match the corresponding respective output signals from the failure-simulating model. When such stimulus signals are identified, these are used to derive corresponding stimulus program instructions which will give rise to those stimulus signals and these stimulus program instructions are added to the current version of the software test program.

In practice, the stimulus discovery may be run until a predetermined number of stimuli which result in rendering a number of previously uncovered failure detectable have been found. The current version of the software test program can then be extended using at least one of these identified stimuli (i.e. with corresponding stimulus program instructions). The first stimuli selected to be added to the software test program is the one which is determined to provide a detectable difference in response both for the previously uncovered failure which was being simulated by the failure-simulating model during the formal method analysis and the greatest number of further previously uncovered failures when the extended software test program is executed. The coverage of such further previously uncovered failures may in practice be determined at the same time as the formal method analysis is performed to identify a stimulus which uncovers the selected failure which is the primary target of the formal method analysis.

Once the self-testing program has been extended with the first software stimulus, further detected software stimuli within the predetermined number which have been identified may additionally be added to the software test program providing they serve to increase the number of detectable differences provided for further uncovered failures by greater than a threshold (user set) amount when they are added. Thus, for example, further software stimuli from the number which have been identified may be added to the software test program providing the failure coverage is increased by a threshold amount, e.g. 10%. This threshold amount may be a user set parameter.

It will be appreciated that the threshold number and the threshold amount provide configuration parameters by which the user of the present technique may tune the analysis to identify software stimuli, and the use of those software stimuli in extending the software test program, in a manner which matches the desired ultimate performance of the software test program and the amount of time and resource which may be devoted to the development of the software test program.

Figure 5:
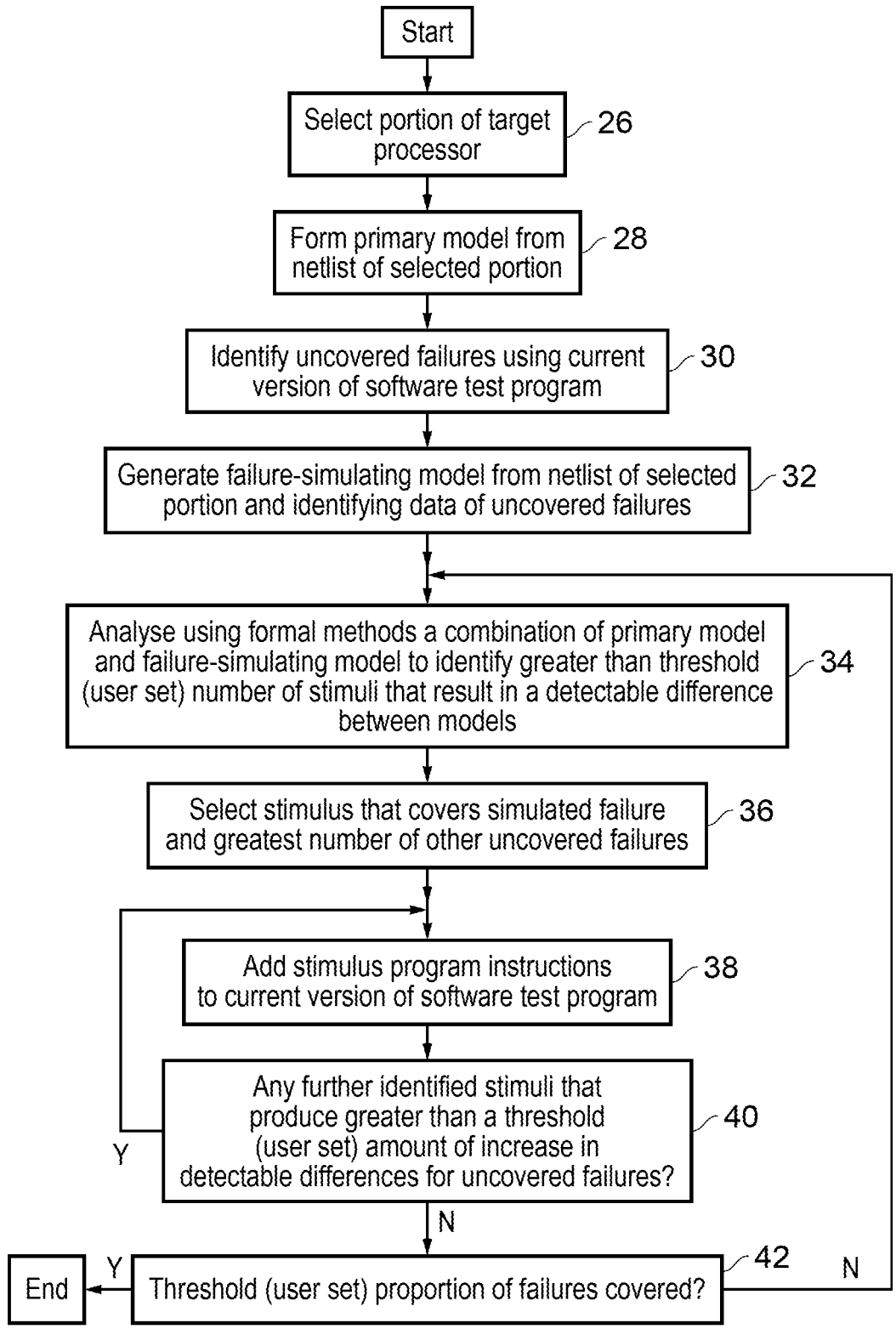
FIG. 5 is a flow diagram schematically illustrating an example method of generating a software test program in accordance with the current techniques.

FIG. 5 is a flow diagram schematically illustrating the process of generating a software test program for a target data processing apparatus comprising an integrated circuit processor for executing program instructions. At step 26 a portion of the target processor is selected within which uncovered failures are to be analysed and appropriate stimuli added to the software test program. The present techniques may be particularly usefully applied to portions of the processor corresponding to the datapaths within the processor.

Step 28 serves to form a primary model form the netlist, which is a file defining component connectivity, within the portion of the target data processing apparatus which has been selected. Step 30 serves to identify uncovered failures within the primary model using the current version of the software test program. Such identification may be, for example, provided by use of the Z01X software tool.

Step 32 serves to generate a failure-simulating model from the netlist of the selected portion and the data generated by step 30 which identifies uncovered failures within that portion when using the current version of the software test program. Such generation of the failure-simulating model may comprise an insertion of appropriate multiplexers as previously described in relation to FIG. 2.

Step 34 serves to subject the combination of the primary model and the failure-simulating model to analysis using a formal method (based upon a mathematical analysis of the combination, e.g. by using the Jasper software produced by Cadence Designs Systems Inc) to identify greater than a threshold number (user set) of software stimuli that result in a detectable difference between the outputs (responses) of the primary model and the failure-simulating model. These differences serve to indicate when the failure simulated by the failure-simulating model during the analysis has arisen.

Step 36 serves to select among the identified stimuli the stimulus that covers the simulated failure that was set and further covers the greatest number of other uncovered failures within the primary model for the current version of the software test program as were identified at step 30. Step 38 serves to add this stimulus (corresponding stimulus program instructions) to the current version of the software test program. Step 40 determines if any further of the identified stimuli produce greater than a threshold (user set) amount of increase in detectable differences for uncovered failures within the primary model and so might usefully be added to the software test program within the current iteration. If such further stimuli are identified, then processing loops back to step 38 where further stimulus program instructions are added to the software test program corresponding to the further identified stimuli.

When no further identified stimuli justify addition to the software test program, step 42 determines whether a threshold (user set) proportion of failures have been covered by the now augmented software test program, e.g. 90% of possible failures would now be detected by execution of the software test program which has been generated. If such a threshold has been exceeded, then processing may end. If such a threshold proportion has not yet been exceeded, then processing returns to step 34 and a further iteration of analysis using formal methods is performed upon a combination of the primary model and the failure-simulating model.

Figure 6:
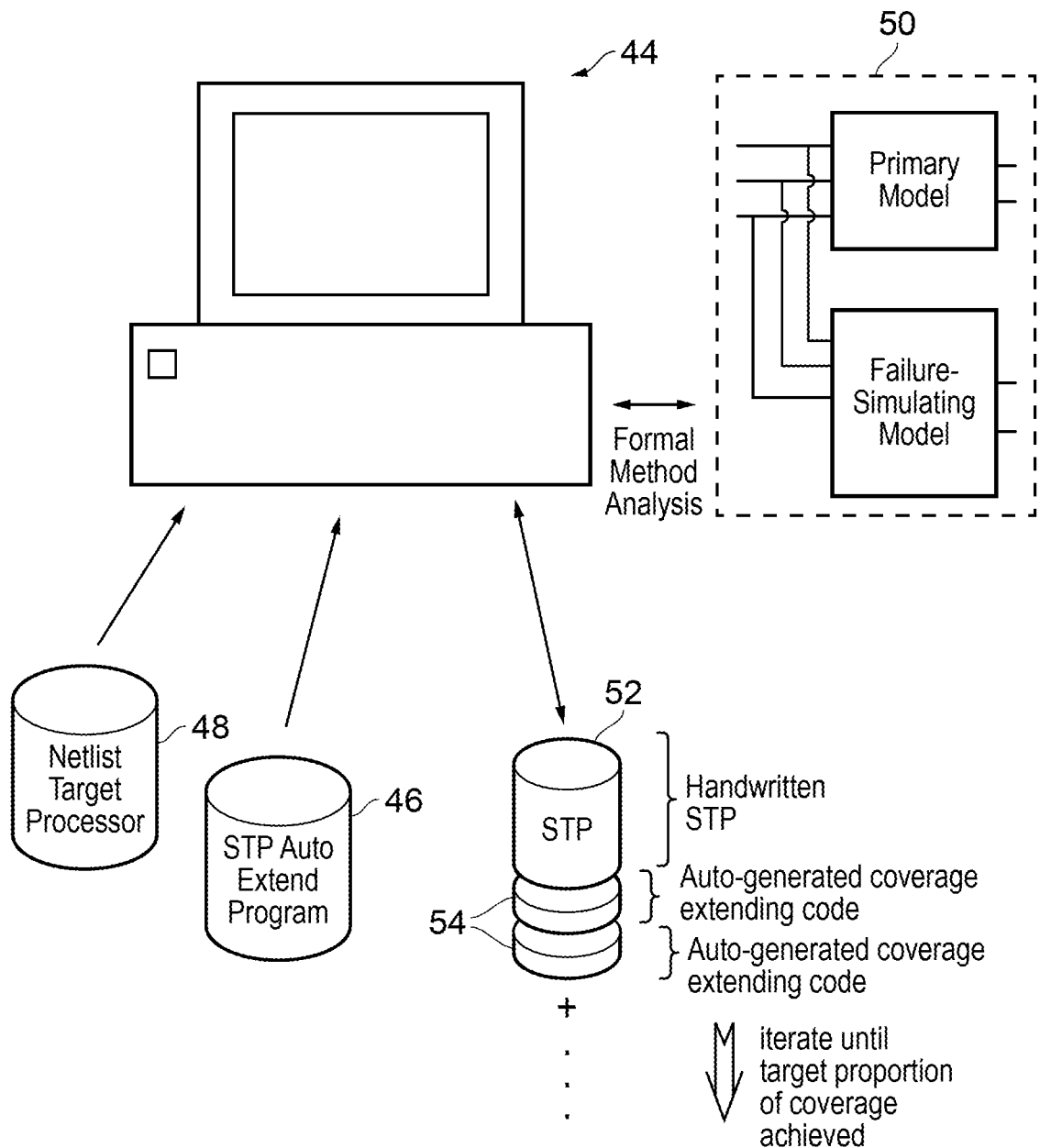
FIG. 6 schematically illustrates an apparatus, associated programs, and data used in generating a software test program in accordance with the present techniques.

FIG. 6 schematically illustrates a system for the automated generation (and/or extension) of software test programs. Such a system comprises a general purpose computer 44 executing a software test program automatic extension program 46 which may be stored on a non-transistors computer readable medium and serves to control the computer 44 to perform the method as illustrated in FIG. 5. Another input to the computer 44 in addition to the software test program automatic extension program 46 is a netlist 48 describing the target processor design for which the software test program is being developed. As illustrated in FIG. 6, the computer 44 performs formal method analysis 50 using a primary model and a failure-simulating model as previously described in order to identify software stimuli and their corresponding stimulus program instructions which may be added to the software test program to increase the failure coverage. As illustrated in FIG. 6, the resulting software test program will typically comprise a handwritten portion 52 (which generally corresponds to to structured assembly language instructions when disassembled) as well as one or more portions of auto-generated coverage extended code 54 which are generated by the methods described above. Such auto-generated coverage extending code is typically relatively unintelligible when disassembled and may contain large numbers of literal values used to apply particular signal stimuli to portions of the target processor design in order to reveal otherwise difficult to uncover failures. The execution of the software test program auto extension program 46 may be iteratively performed until a target proportion of coverage is achieved.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

I claim:

1. A computer implemented method of generating a software test program for execution by target data processing apparatus to test for failure of said target data processing apparatus, said method comprising:
    simulating execution of a current version of a software test program using a primary model of at least a portion of said target data processing apparatus;
    determining whether or not there is a detectable difference in output of said current version of said software test program simulated using said primary model when failures are simulated at different points within said primary model;
    identifying based on said detectable difference in output of said primary model an uncovered failure within said target data processing apparatus that is undetected by execution of said current version of said software test program by said target data processing apparatus;
    generating data identifying said uncovered failure within said target data processing apparatus, wherein said data identifying said uncovered failure identifies a point within a layout of said primary model of said uncovered failure;
    generating using said data identifying said uncovered failure a failure-simulating model of said at least a portion of said target data processing apparatus providing an ability to simulate said uncovered failure;
    analyzing a combination of said primary model and said failure-simulating model to identify a software stimulus corresponding to execution of a stimulus program instruction that results in a detectable difference in response between said primary model and said failure-simulating model when simulating said uncovered failure; and
    adding said stimulus program instruction to said current version of software test program to form an updated version of said software test program.

2. A computer implemented method as claimed in claim 1, wherein said analyzing uses a formal method based upon a mathematical analysis of said combination.

3. A computer implemented method as claimed in claim 1,
    wherein said analyzing identifies a plurality of software stimuli that result in a detectable difference in response between said primary model and said failure-simulating model when simulating said uncovered failure, and
    said computer implemented method further comprising selecting among said plurality of software stimuli a software stimulus for adding to said current version of said software test program that provides a detectable difference for both said uncovered failure and a greatest number of further uncovered failures detected by said step of identifying using said primary model.

4. A computer implemented method as claimed in claim 3, comprising adding to said current version of said software test program further of said plurality of software stimuli that result in an increase of greater than a threshold amount in providing a detectable difference for said further uncovered failures.

5. A computer implemented method as claimed in claim 4, wherein said threshold amount is a user set parameter.

6. A computer implemented method as claimed in claim 1, wherein said analyzing is continued until greater than a threshold number of software stimuli are identified that result in a detectable difference in response between said primary model and said failure-simulating model when simulating said uncovered failure.

7. A computer implemented method as claimed in claim 6, wherein said threshold number is a user set parameter.

8. A computer implemented method as claimed in claim 1, wherein said primary model and said failure-simulating model are generated from a netlist file defining component connectivity of said target data processing apparatus.

9. A computer implemented method as claimed in claim 1, wherein said target data processing apparatus comprises an integrated circuit processor for execution program instructions.

10. A computer implemented method as claimed in claim 9, wherein said at least a portion of said target data processing apparatus comprises a datapath portion of said integrated circuit processor.

11. A computer implemented method as claimed in claim 1, wherein said uncovered failure is a stuck-at failure at one of an input or an output of a standard cell component of said target data processing apparatus.

12. A computer implemented method as claimed in claim 11, wherein said failure-simulating model adds to said primary model a model of multiplexer selectively supplying a stuck-at signal value to said failure node in response to a failure-activating selection signal.

13. A computer implemented method as claimed in claim 1, wherein said method is performed iteratively until a threshold proportion of possible failures of said target data processing apparatus are detectable by execution of said software test program.

14. A computer implemented method as claimed in claim 13, wherein said threshold proportion is a user set parameter.

15. A non-transitory computer readable medium storing a computer program to control a computer to perform a method as claimed in claim 1.

16. A non-transitory computer readable medium storing a software test program generated using a computer implemented method as claimed in claim 1.

17. Apparatus for generating a software test program, said apparatus comprising a data processing apparatus programmed to perform a computer implemented method as claimed in claim 1.

* * * * *